No. 618,856. Patented Feb. 7, 1899.
C. G. EVANS.
BICYCLE GEAR.
(Application filed Apr. 23, 1897.)
(No Model.) 3 Sheets—Sheet 1.
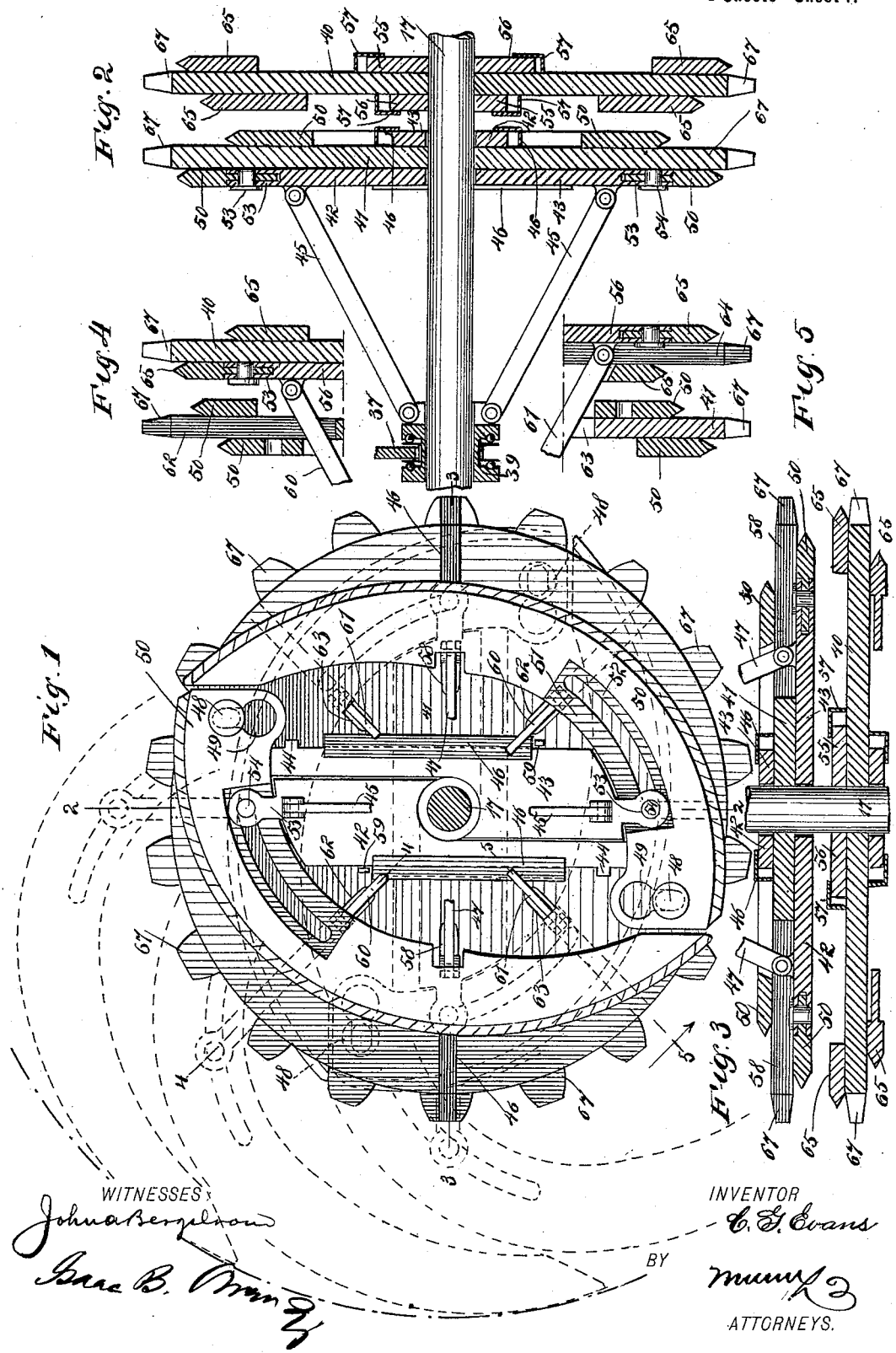
WITNESSES
INVENTOR
C. G. Evans
BY
ATTORNEYS.

No. 618,856. Patented Feb. 7, 1899.
C. G. EVANS.
BICYCLE GEAR.
(Application filed Apr. 23, 1897.)
(No Model.) 3 Sheets—Sheet 2.
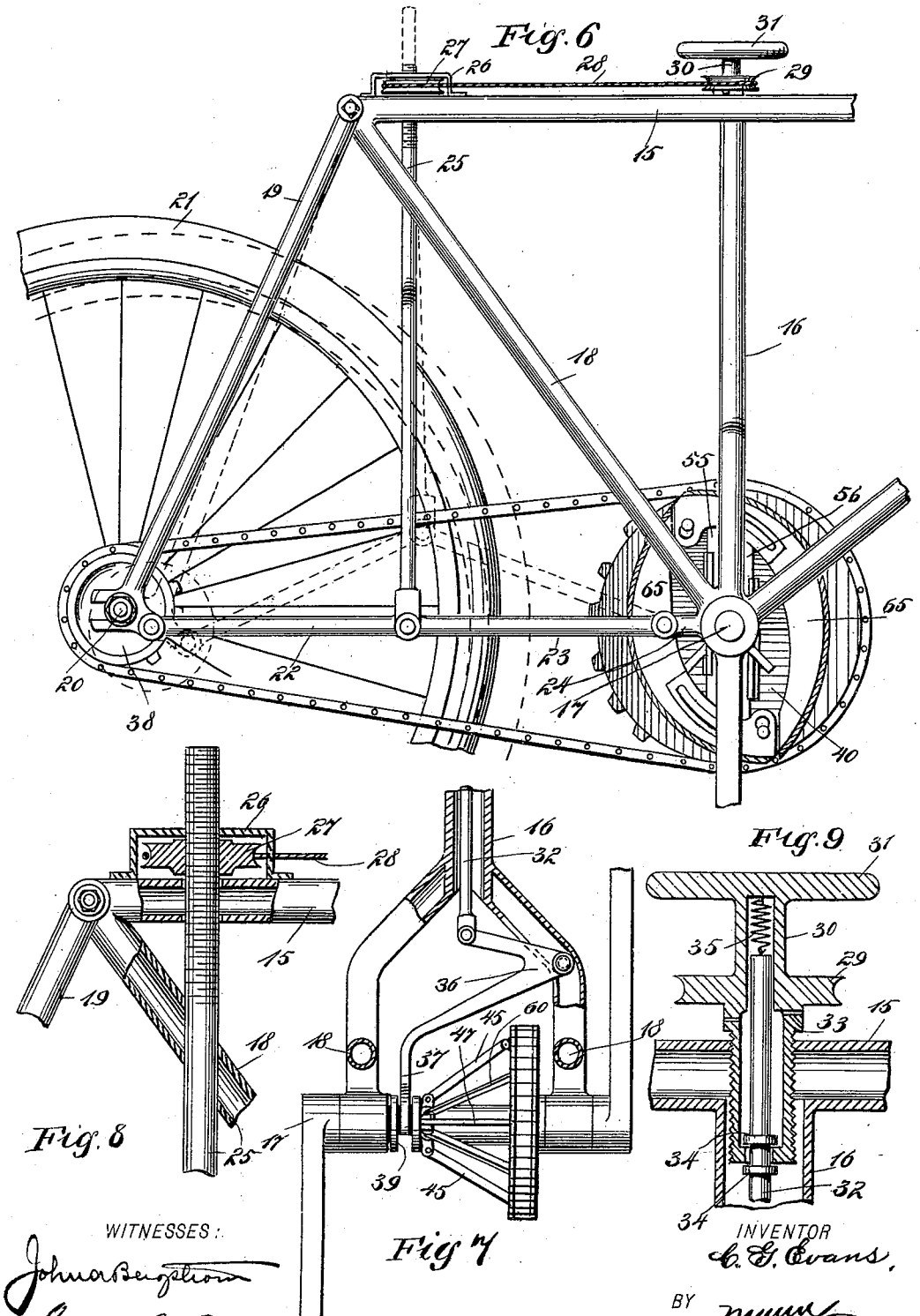
WITNESSES:
INVENTOR
C. G. Evans,
BY
ATTORNEYS.

No. 618,856. Patented Feb. 7, 1899.
C. G. EVANS.
BICYCLE GEAR.
(Application filed Apr. 23, 1897.)
(No Model.) 3 Sheets—Sheet 3.
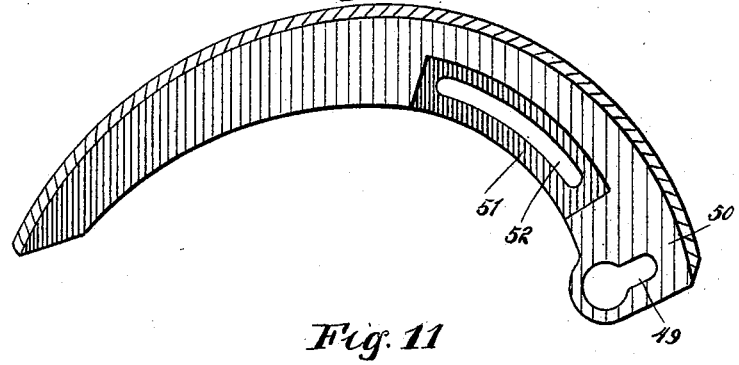
Fig. 10
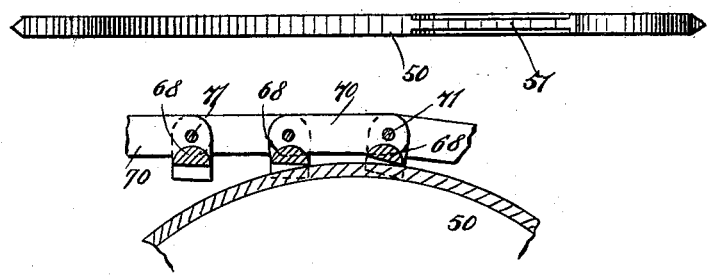
Fig. 11
Fig. 12
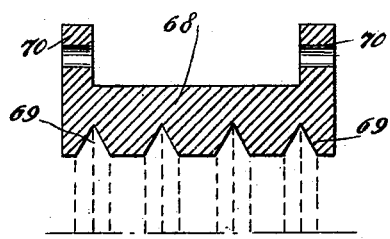
Fig. 13
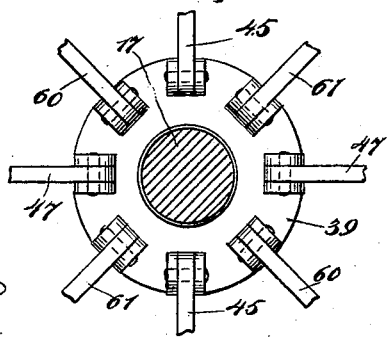
Fig. 14
WITNESSES:
John A Bergstrom
Isaac B. Owens
INVENTOR
C. G. Evans
BY
ATTORNEYS.

UNITED STATES PATENT OFFICE.

CHARLES G. EVANS, OF UNION, CANADA.

BICYCLE-GEAR.

SPECIFICATION forming part of Letters Patent No. 618,856, dated February 7, 1899.

Application filed April 23, 1897. Serial No. 633,457. (No model.)

*To all whom it may concern:*

Be it known that I, CHARLES G. EVANS, of Union, in the Province of British Columbia and Dominion of Canada, have invented a new and Improved Bicycle-Gear, of which the following is a full, clear, and exact description.

The purpose of this invention is to provide driving-gear for bicycles and other vehicles, which gear may be changed to any degree of speed within two extreme points, the invention being distinguished from apparatus of the class in which the gearing can be changed only to certain fixed speeds.

This specification is the disclosure of one form of my invention, while the claims define the actual scope of my conception.

Reference is to be had to the accompanying drawings, forming a part of this specification, in which similar characters of reference indicate corresponding parts in all the figures.

Figure 1 is a side elevation of the sprocket-wheel. Fig. 2 is a sectional view on the line 2 2 of Fig. 1. Fig. 3 is a sectional view on the line 3 3 of Fig. 1. Fig. 4 is a sectional view on the line 4 4 of Fig. 1. Fig. 5 is a sectional view on the line 5 5 of Fig. 1. Fig. 6 is an elevational view showing my invention applied to a bicycle. Fig. 7 is a fragmentary front elevation showing the means for operating the sprocket-wheel. Figs. 8 and 9 are detail sections illustrating parts to be hereinafter described. Fig. 10 is a side elevation of one of the expanding-plates. Fig. 11 is a plan view thereof. Fig. 12 is a detail section illustrating the sprocket-chain and action on the sprocket-wheel. Fig. 13 is a detail section of the sprocket-chain, and Fig. 14 is a fragmentary elevation showing a portion of the sprocket-wheel-operating devices.

The frame of the bicycle has a top bar 15, from an intermediate portion of which projects a downwardly-extending brace 16, forked at its lower end to carry a crank-shaft 17. The rear end of the top bar 15 has a brace 18, running downwardly and forwardly therefrom and having its lower portion forked and the arms of the fork respectively joined to the lower ends of the fork in the brace 16. Pivoted to the rear end of the bar 15 are two rods 19, one of which is shown in the drawings, which rods carry the axle 20 of the rear wheel 21. Pivoted to the lower end of each rod 19 is a link 22. The links 22 both extend forwardly and are respectively pivoted to the rear ends of the links 23, which project forwardly from the links 22 and are respectively pivoted to stubs 24, carried, respectively, by the bearings at the arms of the fork at the lower end of the brace 16. Fig. 6 shows one side of the machine, and therefore only illustrates one of the parts 22, 23, and 24. These parts are duplicated on each side of the machine, as will be understood from prior constructions, the parts 22 and 23 taking the place of the backstays on the usual diamond frame of the bicycle.

Run vertically through the upper portion of the brace 18 and through the rear portion of the bar 15 is a rod 25. The lower end of the rod 25 is forked to embrace the wheel 21, and the members of the fork are respectively pivoted to the joints between the links 22 and 23. Carried on the upper side of the rear portion of the bar 15 is a guide-plate 26, which holds a nut 27 on the threaded upper end of the rod 25. The turning of the nut 27 on the rod 25 causes the rod to be raised or lowered, according to the direction in which the nut is turned. The periphery of the nut 27 is circular and grooved to receive the band 28, which runs forwardly to a pulley 29, fixed on a tubular head 30, having a hand-wheel 31, by which it may be operated, and receiving the upper end of a rod 32, which runs downwardly through the brace 16. Carried partly within the upper end of the brace 16 and projecting through the bar 15 is an exteriorly-threaded sleeve or tube 33, the threads of which mesh with corresponding threads on the bar 15. The lower end of the tube 33 is engaged by collars 34 on the rod 32, so that the tube 33 may turn independently of the rod 32, but cannot slide. The lower end of the head 30 and the upper end of the sleeve or tube 33 have matching corrugated faces which are held normally in engagement with each other by a retractile spring 35, carried in the upper portion of the cavity in the head 30. The lower end of the rod 32 is pivoted to the short arm of a bell-crank lever 36, fulcrumed in the fork at the lower end of the brace 16 and having its longer and lower arm bent downwardly to form a fork 37 to engage with the sprocket-operating devices. By turning the handle 31 the rod 32 may be raised or lowered to adjust the sprocket-wheel. At the same time the rod 25 will be raised or lowered to swing the links 22 and 23, which have the operation of toggle-links. This will cause the axle of the wheel 21 to be moved forward or rearward. The adjustment of the sprocket-wheel results in enlarging or decreasing the diameter thereof, and the movement of the wheel 21, as just described, regulates the tension of the sprocket-chain, which passes over the driving sprocket-wheel and over the usual sprocket-wheel 38, fixed on the axle 20 of the wheel 21. Therefore the adjustment of the driving sprocket-wheel is in unison with the adjustment of the chain, and the proper ratio between the two is automatically maintained. Should it be desired to adjust the tension of the chain independently of the condition of the driving sprocket-wheel, the head 30 may be raised to disengage the head 30 from the sleeve or tube 33, whereupon the pulley 29 may be turned independently of the sleeve 33, for which purpose the spring 35 may be swiveled to the rod 32.

Sliding on the crank-axle 17 is a collar 39, which is engaged by the fork 37 of the elbow-lever 36. Fixed on the crank-axle 17 are two disks 40 and 41, respectively. The disk 41 has at each side two plates 42 and 43. The plates 42 and 43 on each side of the disk 41 are arranged at right angles to each other. The plates 42 and 43 are duplicates in construction, and each plate has a wide portion running for one-half its length and contiguous to a narrow portion on the immediately-coacting plate. The outer end of the narrow portion of each plate 42 and 43 has a lug 44 projecting transversely therefrom and respectively adapted to engage projections 59 on the faces of the disk 41. Each plate 42 and 43 is guided to slide on the disk 41 by means of guide-plates 46, fixed to the respective faces of the disk 41 and projecting outwardly and inwardly over the edges of the plates 42 and 43. The inner middle portion of each plate 42 and 43 is shaped to fit snugly around the axle 17 when the plates are at the limit of their inward movement. The plates 42 and 43, which are on the left-hand side of the disk 41, or that side adjacent to the collar 39, are respectively provided with pivotally-connected links 45, running leftward and pivotally connected to ears on the collar 39. By sliding the collar 39 on the shaft 17 the plates 42 and 43 may be moved radially on the disk 41. The disk 41 is provided with two slots 58. Through the slots 58 links 47 respectively project and are pivoted, respectively, to the plates 42 and 43, which slide against the right-hand side of the disk 41, or that side which is farthest from the collar 39. The links 47 extend leftward to the collar 39 and are pivotally connected to ears thereon.

When, therefore, the collar slides, all of the plates 42 and 43 on the disk 41 will be moved accordingly and in unison with each other.

Fixed to and projecting from each side of the disk 41 are two headed pins 48. The pins 48 are arranged in radial alinement with each other on each side of the disk 41, and the two lines thus described are disposed at right angles to each other, as may be seen best by reference to Fig. 1. Each pin 48 is received in a slot 49, respectively formed in the pivot ends of the expansion-plates 50. The expansion-plates 50 are shown in detail in Figs. 10 and 11. Each plate 50 has the slot 49 thereof formed with a contracted outer portion and with an enlarged circular inner portion. Each plate also has a convex outer edge beveled on each side to have a V form. The inner edge of each plate has a reduced portion 51 adjacent to its pivot end and provided with a slot 52, curved in conformity with the curvature of the plate. Each plate 42 and 43 has at its outer end a bifurcated lug 53. The lugs 53 have their members respectively embracing the reduced portions 51 of the plates 50 and respectively carry rivets 54, running through the slots 52. By these means each plate 50 is pivotally and slidably connected with the respective plates 42 and 43. In Fig. 1 the full lines show the left-hand plates 50 in their closed position, when the free or moving end of one plate is directly adjacent to the pivot or constant end of the contiguous plate. When the parts are in this position, the plates 42 and 43 are drawn inward as far as possible. When the plates 42 and 43 are moved outward by the links 45 and 47, the plates 50 are first moved bodily radially with respect to the disk 41 until the pins 48 seat in the enlarged inner portions of the slots 49, whereupon the plates 50 begin to swing on pivots formed by the pins 48 and assume the positions shown in dotted lines in Fig. 1, according to the extent of movement given the plates 42 and 43. This operation is performed by the plates 50 and 42 and 43 on each side of the disk 41.

The disk 40 is fixed to the axle 17 directly adjacent to the right-hand side of the disk 41. The disk has at each side a plate 55 and a plate 56, which are analogous to the plates 42 and 43 and are held to slide on the disk 40 by means of guide-plates 57 similar to the guide-plates 46, described with reference to the disk 41. Each plate 55 and 56 is also provided with stop devices similar to the stop devices 44 and 59. (Shown in Fig. 1.) These devices for the disk 40 are not shown in the drawings, since their construction is fully shown by the illustration relative to the parts 44 and 59. The plates 55 and 56 on each side of the disk 40 are respectively pivotally connected to links 60 and 61. The links 60 extend through slots 62 in the disk 41 and are pivoted to the plates 55 and 56, which are on the left-hand side of the disk 40. The links 61 extend through slots 63 in the disk 41 and through slots 64 in the disk 40, so as to be pivotally connected with the left-hand sides of the respective plates 55 and 56. The links 60 and 61 extend leftward and are pivoted to lugs on the collar 39. By these means the sliding of the collar 39 actuates the plates 55 and 56 as well as the plates 42 and 43. Pivoted on each side of the disk 40 are two expansion-plates 65, which are duplicates of the plates 50 and provided with slots similar to the slots 49, which slots receive pins similar to the pins 48, by which means the plates 65 are mounted on the disk 40, so as to have the same operation which the plates 50 have. The plates 56 and 55 are respectively pivotally connected with the plates 65, so that upon the sliding of the plates 55 and 56 under the influence of the plates 60 and 61 the plates 65 will be moved out in the same manner as the plates 50 and in unison with the movement of said plates 50.

The peripheries of the disks 41 and 40 are provided with sprocket-teeth 67. When the sprocket-gear is in its contracted form, as shown by full lines in Figs. 1 to 5 of the drawings, the sprocket-chain will run on the teeth 67, whereupon the machine is geared at its lowest degree. When the sprocket-wheel is enlarged to increase the gear, the plates 50 and 65 run out, as shown by dotted lines in Fig. 1, and raise the chain from the teeth 67, the curved outer edges of the plates 50 and 65 and the disposition of the plates as described forming a true wheel on which the sprocket-chain is carried and whereby the sprocket-chain is driven at a higher speed than before.

The sprocket-chain is of peculiar construction, which will now be described. Each link of the chain consists in a transverse bar 68, the under surface of which is provided with four V-shaped grooves 69, running longitudinally with the chain and transversely with the bar. Each end of the bar has fixed thereto one end of a longitudinal side plate 70. The side plates 70 are two for each link and run parallel with each other, the side plates in alternating links being of different width apart, so that they may be joined to each other, as shown in Fig. 12, by rods 71, running transversely between the plates 70. When the driving sprocket-wheel is contracted to its lowest gear, the teeth 67 project between the plates 70 and the bars 68. When the expansion-plates 50 are run out to enlarge the gear of the driving-sprocket, the V-shaped outer edges of the plates 50 and 65 will run in the grooves 69. The adjusting devices, composed of the parts 32, 30, 27, and 25, being friction-tight in their respective supports, serve to hold the driving sprocket-wheel and the links 22 and 23 securely in the positions to which they are put. Consequently the plates 50 are held rigidly in their extended positions and form a constant circular surface on which the chain may run. The adjusting devices and the construction of the driving sprocket-wheel enable the machine to be geared at any possible degree within the two extremes. The machine is not dependent upon a certain fixed set of changes.

An expansive spring may be placed on the shaft 17, adjacent to the disk 41, to be engaged by the collar 39, so as to prevent the expansion-plates 50 and 65 from moving outward by centrifugal force when the sprocket-wheel is put to its highest gear.

Having thus described my invention, I claim as new and desire to secure by Letters Patent—

1. The combination with a sprocket-wheel, of a plurality of movable plates mounted upon the side of the sprocket-wheel, each plate being adjustable toward and from the center of the wheel in a plane parallel with that of the said wheel, whereby the plates can be set to project beyond the periphery of the wheel or to lie within the periphery of the same, substantially as and for the purpose set forth.

2. The combination with a sprocket-wheel, of a plurality of plates pivoted to the side of the sprocket-wheel to swing toward and from the center of the wheel in planes parallel with the said wheel, whereby the plates when projected will extend beyond the periphery of the wheel and when retracted will lie within the periphery of the same, substantially as described.

3. The combination with a sprocket-wheel, of a plurality of plates having a pivotal and sliding connection with the wheel, and means for sliding and swinging the said plates out beyond the teeth of the wheel, substantially as described.

4. In a sprocket-wheel, the combination of a toothed disk having a plurality of pins arranged at different points thereon, a plate for each pin, each plate having a slot respectively receiving the pins whereupon the plates are pivotally and slidably mounted, the plates being capable of swinging outward beyond the teeth of the disk to form an enlarged periphery therefor, and means for operating the plates.

5. The combination of a disk, a series of plates pivoted thereon and capable of swinging outward from the disk to form an enlarged periphery therefor, additional plates sliding radially on the face of the disk and respectively connected to the first-named plates, and means in connection with said additional plates by which they may be operated.

6. The combination with a supporting or main member having a projection thereon, of a plate having two slots one of which receives the projection, whereby to mount the plate to slide and swing, a second plate sliding on the said supporting or main member and having connection with the second slot of the first-named plate, and means for operating the second plate.

7. The combination with a disk, of two expansion-plates pivotally connected thereto and capable of swinging outward from the periphery thereof, two sliding plates bearing on the face of the disk and respectively slidably connected with the expansion-plates, and means for operating the sliding plates.

8. The combination of a disk, an expansion-plate pivoted thereon and having a reduced portion provided with a slot, a plate sliding on the face of the disk and having a bifurcated projection embracing the reduced portion of the expansion-plate and carrying a pin running in the slot of said reduced portion, and means for operating the sliding plate.

9. The combination with a shaft, of two disks fixed thereon, a collar sliding on the shaft, a plurality of expansion-plates pivoted on the disk near to the collar, sliding plates on said near disk, the sliding plates being respectively connected to the expansion-plates, links respectively pivoted to the sliding plates and to the collar, expansion-plates pivoted on the disk far from the collar, sliding plates carried on said far disk, and links pivoted to the collar and projecting through openings in the near disk to engagement with the sliding plates on the far disk.

10. The combination with a shaft, of a disk fixed thereon, a collar sliding on the shaft, an expansion-plate pivoted to one face of the disk, a sliding plate mounted on said face of the disk and connected to the expansion-plate, a link pivoted to the collar and to the said sliding plate, a second expansion-plate pivoted on the remaining face of the disk, a second sliding plate mounted on the said remaining face of the disk and pivoted to the sliding plate of said remaining face, and a second link connected to the collar and projected through an opening in the disk and pivoted to the second-named sliding plate.

11. The combination with a disk having sprocket-teeth on its periphery, of a plurality of expansion-plates pivoted to the disk to swing toward and from the center of the disk, and means for swinging the said plates on their pivots, whereby provision is made for projecting the plates beyond the periphery of the disk to enlarge the circumference thereof, substantially as described.

12. A sprocket-chain consisting of links, each formed of a transverse bar having grooves in its inner face and having side plates respectively at its ends, the side plates running transversely to the bars and parallel with each other.

13. A sprocket-chain, consisting of links, each formed with a transverse bar having V-shaped transverse grooves in its inner face, and provided at each end with a rigid side plate, said plates projecting upwardly from the ends of the bar and then beyond one side of the same parallel with each other, substantially as described.

14. In a bicycle, the combination with the drive-wheel, and its sprocket-wheel, of a sprocket-wheel having movably-mounted plates adapted to be projected out beyond the teeth of the wheel, and a sprocket-chain passing over said sprocket-wheels, said chain having open spaces and provided with transverse bars having in their under surfaces grooves extending transversely of the same, substantially as and for the purpose set forth.

15. In a vehicle, the combination of a driving-wheel mounted to swing on the frame of the vehicle, a link pivoted to a stationary part of the vehicle, a second link pivoted to the first link and to the means for mounting the driving-wheel, and a rod connected to the two links at the joint between the same, whereby the driving-wheel is moved.

16. The combination with the main frame, of an auxiliary frame pivoted to the main frame and in which the rear wheel is mounted, a link pivoted to the main frame, a second link pivoted to the auxiliary frame and to the first link, and a bar connected to the links at their joints to swing the links and thereby adjust the rear wheel, substantially as described.

17. In a bicycle, the combination with the frame, of a drive-wheel mounted to swing, a sprocket-wheel carried by said wheel, a sprocket-wheel having pivoted plates adapted to be moved out beyond the teeth of the same, said plates having V-shaped outer edges, a chain passing over said sprocket-wheels and having open spaces and provided with transverse bars having on their under surfaces grooves extending in direction of the length of the chain, and means for simultaneously adjusting the drive-wheel and swing the plates of the sprocket-wheel to expand it, substantially as described.

18. The combination with a frame, of a rod mounted therein, a sleeve mounted to turn on the rod and having threaded connection with the frame, a head movable on the rod and capable of engaging the sleeve to turn the sleeve with the head, and a spring connected to the rod and to the head and removably holding the head and sleeve in engagement with each other.

19. The combination with the main frame, and an expansible sprocket-wheel carried thereby, of an auxiliary frame pivoted to the main frame, a rear wheel mounted in the auxiliary frame and provided with a sprocket-wheel, a belt passing over the sprocket-wheels, toggle-links connecting the said frames, and means for adjustably holding the toggle-links, substantially as described.

20. In a bicycle, the combination with the frame, and a drive-wheel mounted to swing, of links pivoted together and connecting the swinging part of the frame carrying the drive-wheel with the main part of the frame, a rod secured to the joint of the said links and having its upper end screw-threaded and extending through the frame, and a nut on the threaded end of the said rod, substantially as described.

21. In a bicycle, the combination with the frame having a pivoted rear portion carrying the rear wheel, a toggle connection between the portions of the frame and an expansible sprocket-wheel, of a rod secured to the said toggle connection and having its upper end screw-threaded, a nut on the screw-threaded portion of the rod, a rod for operating the expansible sprocket-wheel, a pulley, a connection between the pulley and rod, means for operating the pulley, and a belt passing around said pulley and nut, substantially as described.

CHARLES G. EVANS.

Witnesses:
WILLIAM ALLSOPP,
JOHN BULLOCK.